US005512962A

United States Patent [19]
Homma

[11] Patent Number: 5,512,962
[45] Date of Patent: Apr. 30, 1996

[54] MOTION VECTOR DETECTING APPARATUS FOR MOVING PICTURE

[75] Inventor: Hideki Homma, Tokyo, Japan

[73] Assignee: NEC Corporation, Tokyo, Japan

[21] Appl. No.: 498,191

[22] Filed: Jul. 5, 1995

Related U.S. Application Data

[63] Continuation of Ser. No. 248,239, May 24, 1994, abandoned.

[30] Foreign Application Priority Data

May 25, 1993 [JP] Japan ..................................... 5-144422

[51] Int. Cl.$^6$ ........................................................ H04N 7/28
[52] U.S. Cl. ........................... 348/699; 348/700; 348/412; 348/413; 348/415; 348/416
[58] Field of Search ........................................ 348/699, 700, 348/416, 415, 411, 410

[56] References Cited

U.S. PATENT DOCUMENTS

| | | | |
|---|---|---|---|
| 4,937,666 | 6/1990 | Yang . | |
| 4,998,168 | 5/1991 | Gillard | 348/700 |
| 5,055,925 | 10/1991 | Lamnabbi | 348/699 |
| 5,083,202 | 1/1992 | Parke | 348/699 |
| 5,130,797 | 7/1992 | Murakami et al. | 348/416 |
| 5,142,360 | 9/1992 | Niihara | 348/699 |
| 5,144,424 | 9/1992 | Savatier | 348/409 |
| 5,151,784 | 9/1992 | Lavagetto et al. | 348/699 |
| 5,173,772 | 12/1992 | Choi | 348/700 |
| 5,196,932 | 3/1993 | Hoshi | 348/699 |
| 5,257,102 | 10/1993 | Wilkinson | 348/699 |
| 5,311,307 | 5/1994 | Yoshimoto | 348/699 |
| 5,329,318 | 7/1994 | Keith | 348/700 |
| 5,369,449 | 11/1994 | Yukitake et al. | 348/699 |

FOREIGN PATENT DOCUMENTS

| | | |
|---|---|---|
| 0447068 | 9/1991 | European Pat. Off. . |
| 549023 | 2/1993 | Japan . |
| 2236449 | 4/1991 | United Kingdom . |

OTHER PUBLICATIONS

Article Video Information Magazine, Jun. 1991, pp. 83–89 in Image Processing Data Book 2nd Edition, SGS–Thomson Microelectronics.
Proceedings of the IEEE 1993 Custom Integrated Circiuts Conference, 9 May 1993, pp. 1121–1124, Uramoiti et al, "A Half-Pel Precision Motion Estimation Processor for NTSC–Resolution Video".
IEEE Transactions on Consumer Electronics, vol. 38, No. 3, Aug. 1, 1992, pp. 570–575, P. Schiefer, "Processing RAMs (PPRAMs) for Motion Estimation".
IEEE Transactions on Circuits and Systems, vol. 36, No. 10, Oct. 1, 1989, pp. 1291–1300, R. C. Kim et al, "A VLSI Architecture for a Pel Recursive Motion Estimation Algorithm".
Video Information Magazine, Jun. 1991, pp. 83–89.

*Primary Examiner*—Tommy P. Chin
*Assistant Examiner*—Anand S. Rao
*Attorney, Agent, or Firm*—Sughrue, Mion, Zinn, Macpeak & Seas

[57] ABSTRACT

A motion vector detection apparatus for a moving picture which can detect a motion vector of a half pel accuracy at a high speed by pipeline processing. The motion vector detection apparatus comprises a buffer memory for storing pel data of a search area within a reference frame required for detection of a motion vector, another buffer memory for storing peldata of an object block for motion vector detection, a half pel interpolation circuit for interpolating half pels horizontally and vertically into the pel data stored in the first buffer memory, a motion vector detection circuit for performing block matching between peldata of a search area outputted from the pelinterpolation circuit and the pel data stored in the second buffer memory and outputting a sum total of absolute values of differences between the individual pels for a plurality of candidate vectors, and a minimum value detector for detecting a minimum value of the output of the motion vector detection circuit and outputting the value of the candidate vector corresponding to the minimum value as a motion vector.

2 Claims, 11 Drawing Sheets

| Clock/Bus | | | | | | | | | | | | | | | | |
|---|---|---|---|---|---|---|---|---|---|---|---|---|---|---|---|---|
| CLOCK | ⊓⊓⊓⊓⊓⊓ ---- | | | | | | | | | | | | | | | |
| 106 INPUT | 1 L0 | 37 L1 | 73 L2 | 109 | 145 | 181 | 217 | 253 | 289 | 325 | | | | | | |
| 103a Bus0 | | | | 77 L0 | 113 L1 | 149 L2 | 185 L3 | 221 L4 | 257 L5 | 293 L6 | 329 L7 | | | | | |
| 103b Bus1 | | | | | 82 L0.5 | 118 L1.5 | 154 L2 | 190 L2.5 | 226 L3.5 | 262 L4.5 | 298 L5.5 | | L6.5 | | | |
| 103c Bus2 | | | | | | 87 L1 | 123 L2 | 159 L3 | 195 L4 | 231 L5 | 267 L6 | 303 L7 | | | | |
| 103d Bus3 | | | | | | | 92 L1.5 | 128 L2.5 | 164 L3.5 | 200 L4.5 | 236 L5.5 | 272 L6.5 | 308 L7.5 | | | |
| 103e Bus4 | | | | | | | | 97 L2 | 133 L3 | 169 L4 | 205 L5 | 241 L6 | 277 L7 | 313 L8 | | |

MOTION VECTOR DETECTING APPARATUS FOR MOVING PICTURE

This is a continuation of application No. 08/248,239, now abandoned, filed May 24, 1994.

BACKGROUND OF THE INVENTION

1. Field of the Invention

This invention relates to an apparatus for detecting a motion vector of a moving picture.

2. Description of the Relation Art

Motion compensation Inter-frame prediction is employed very frequently for high efficiency coding of a moving picture. For example, also in the International Standardization Organization ISO-IEC JTC1/SC2/WG11 (hereinafter referred to as MPEG), motion compensation inter-frame prediction is employed as an international standardization system, and for motion compensation, pels (picture elements) are divided into a plurality of blocks and motion compensation processing is performed in units of a block. The motion compensation processing is employed also in the international standardization system H.261 for moving picture coding for visual telephones. Further, motion compensation in units of a block is generally based on detection of a motion vector by block matching.

In the international standardization system H.261, a motion vector is detected by an accuracy of one pel (picture element), and one of the processors which can be utilized for such motion vector detection is, for example, STI3220 by SGS-THOMSON. Operation of the processor for such motion vector detection with block matching is described in Video Information Magazine, June 1991, pp. 83–89 or in "IMAGE PROCESSING DATA BOOK 2nd EDITION", SGS-THOMSON Microelectronics.

In the MPEG, improvement in coding efficiency is achieved particularly by raising the accuracy of a motion vector to be used for motion compensation to an accuracy of a half pel.

When it is tried to construct a motion vector detection apparatus conforming to the MPEG system, since the calculation processing amount and the memory capacity required for motion vector detection processing have exhibited a remarkable increase compared with those of the international standardization system H.261 in terms of the detection range and the detection accuracy, improvement for remarkable reduction of the calculation amount is required. One of the methods for simplification of motion vector detection is the reduction of candidate vectors by a multi-stage searching method. Such method is described in Japanese Patent Laid-Open Application No. Helsei 5-49023 (Japanese Patent Application No. Helsei 3-199614) which is a prior application of the assignee of the present invention in Japan. In the document, motion vector searching is performed such that motion vector searching in an accuracy of up to two pels is performed from the first stage to the K-1th stage and motion vector searching of another accuracy of one pel or less is performed at the Kth stage thereby to reduce the number of candidate vectors and the number of intra-block pels to be matched upon block matching up the Kth stage to reduce the total amount of calculation processing.

Conventional motion vector detection apparatus require that the accuracies of pels of an object block for motion vector detection and a search area of a reference frame be set equal to each other in advance. Also in the processor STI3220 mentioned hereinabove, when it is tried to detect a motion vector in an accuracy of a half pel, since the accuracies of pels between blocks to be matched are different, pipeline processing between a vector less than the decimal point of a search area after interpolation of half pels and another vector of an integer is difficult.

In order to effect motion vector detection in an accuracy of a half pel which is required newly by the MPEG system, pels in a search area of a reference frame are interpolated by half pel interpolation in advance, the pels are divided into a group of original pels before interpolation, another group of pels is obtained by half pel interpolation in a horizontal direction, a further group of pels is obtained by half pel interpolation in a vertical direction, and a still further group of pels obtained by half pel interpolation in both ① horizontal and vertical directions, and then, either parallel operations are performed by multiple chips, or ② processing is performed for each of the pel groups, which requires that the processing be executed four times.

SUMMARY OF THE INVENTION

It is an object of the present invention to provide a motion vector detection apparatus for a moving picture which can detect a motion vector of a half pel accuracy at a high speed by pipeline processing.

It is another object of the present invention to provide a motion vector detection apparatus for a moving picture wherein an internal memory has a comparatively small capacity so as to facilitate construction the motion vector detection apparatus in the form of a VSLI.

In order to achieve the objects described above, the motion vector detection apparatus is required to have such a circuit construction that pel data of an object block for motion vector detection and a search area to be inputted to the motion vector detection apparatus upon block matching are data of an accuracy of an integral number of pels, a half pel interpolation section is provided in the motion vector detection apparatus such that half pels are interpolated only into the pels of the search area, and the output of pels after interpolation can be utilized in pipeline processing of a motion vector detection circuit.

Further, the motion vector detection apparatus is required to have such a circuit construction that processor elements are arranged so as to allow the motion vector detector to effect pipeline processing efficiently and the half pel interpolator can output a plurality of data at a time while input data to the vector detector can be changed over suitably on the vector detector side.

Thus, according to the present invention, there is provided a motion vector detection apparatus for a moving picture wherein each picture frame of a moving picture composed of a plurality of successive frames is divided into a plurality of blocks each including a plurality of pels and the matching degree between an image of an individual block of a frame and a reference frame different from the frame to which the block belongs is calculated to estimate a motion vector of the moving picture, the motion vector detection apparatus comprising a first storage circuit for storing data of pels of a search area within the reference frame required for detection of a motion vector, a second storage circuit for storing data of pels of an object block for motion vector detection, a half pel interpolation circuit for interpolating half pels horizontally and vertically into the data of pels stored in the first storage circuit, a motion vector detection circuit for performing block matching between pel data of another search area after interpolation outputted from the pel interpolation circuit and the data of pels of the object area for motion vector detection stored in the second storage circuit and outputting a sum total of absolute values of differences between the individual pels for a plurality of candidate vectors, and a minimum value detector for detecting a minimum value of the output of the motion vector detection circuit and outputting the value of one of the candidate vectors which corresponds to the minimum value as a motion vector.

Preferably, the motion vector detection circuit includes M processor elements for accumulating absolute values of differences between individual two adjacent ones of M pels in one row or column of the object block for motion vector detection, M−1 first one-data registers for delaying a pel, 2x(N−M) second registers for delaying a pel, N being the number of pels in one row or column of a search area, M first selectors provided for the individual processor elements each for selecting one data from within output data of the half pel interpolation circuit which interpolates a half pel in horizontal and vertical directions and has 2x(N−M)+1 output ports which is equal to the number of candidate vectors in the vertical or horizontal direction, and a single second selector for selecting an initial value of the accumulated values of the processor elements, each of the first selectors supplying its selected data as search area pel data to one of the processor elements, the processor elements and the first registers being arranged alternately in series while the 2x(N−M) second registers are arranged in series subsequently to the last one of the processor elements and the output of one of the second registers at the last stage is connected to an input of the second selector so that a motion vector of an accuracy of a half pel is detected.

In the motion vector detection apparatus for a moving picture, since the half pel interpolation circuit having one input and a plurality of outputs is provided in the inside of the apparatus and the motion vector detection circuit is constructed such that the processor elements and the first data registers for delaying a pel are arranged in an alternate relationship in series and so that specified inputting/outputting timings of data are provided for motion vector detection by block matching, block matching between blocks of different accuracies of pels, that is, block matching between an object block for motion vector detection of an accuracy of an integral number of pels and a search area of another accuracy of a half pel, can be effected efficiently by pipeline processing and a motion vector of an accuracy of a half pel can be detected. Further, by placing 0 or an average value (dc component) of the object block for motion vector detection into search area pel data storing registers of all of the processor elements, it is possible to determine L1 norms (ac components) from the dc component of the object block for motion vector detection or the average value of the object block for motion vector detection. Consequently, resulted data can be utilized as evaluation data for MC determination (determination whether or not a difference between frames when no motion is involved should be coded depending upon whether or not a motion vector detected is used) and for determination of intra-frame/inter-frame coding.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENTS

Figure 1:
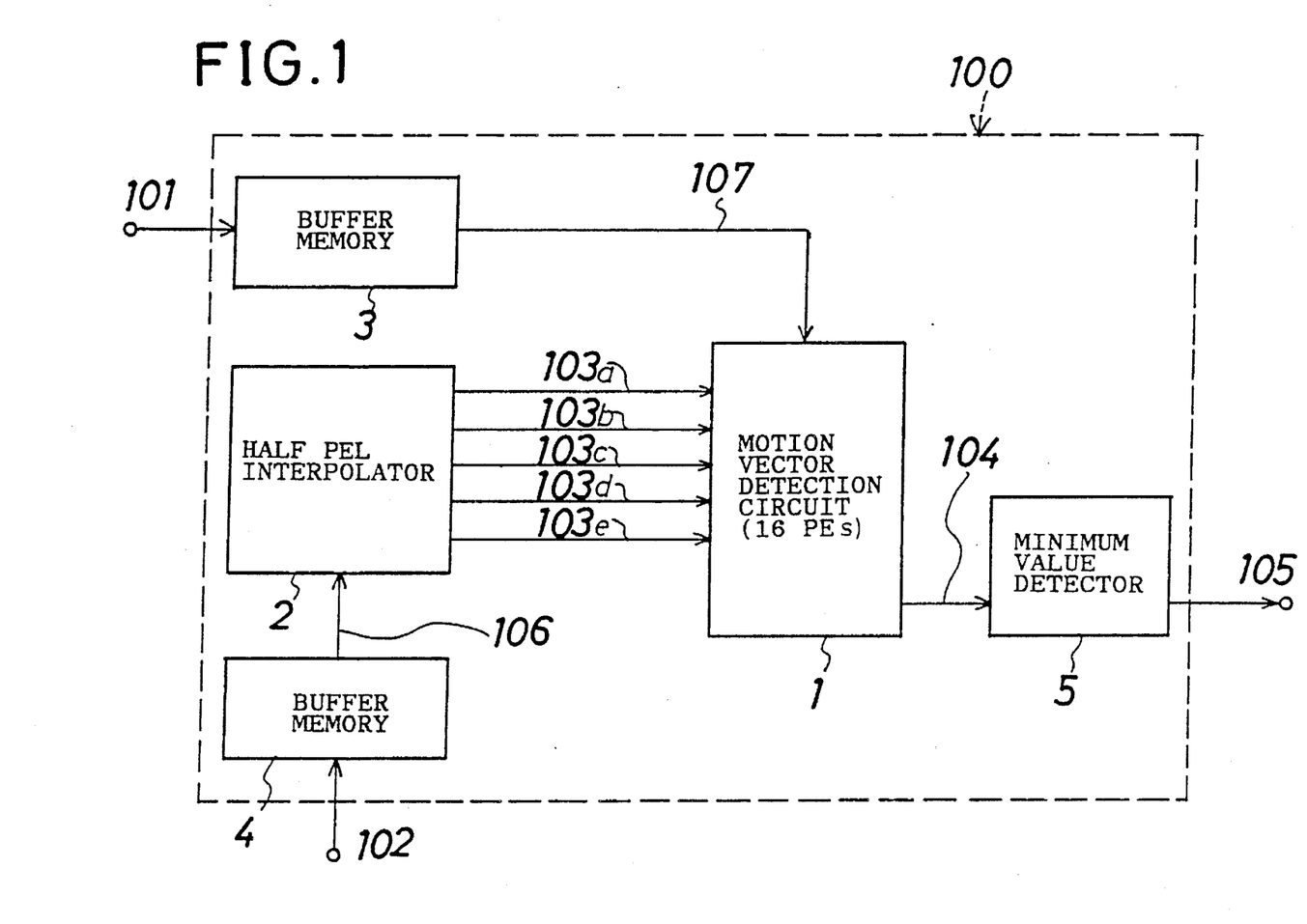
FIG. 1 is a block diagram of a motion vector detection apparatus showing a preferred embodiment of the present invention.

Referring first to FIG. 1, there is shown a basic construction of a motion vector detection apparatus according to the present invention. The motion vector detection apparatus is generally denoted at 100 and includes a motion vector detection circuit 1 which includes M processor elements (PEs), a half pel interpolator 2, a buffer memory 3 for storing pel data of an object block for motion vector detection, another buffer memory 4 for storing pel data of a search area of a reference frame, and a minimum value detector 5.

It is assumed that, in a motion vector detection system employed in the motion vector detection apparatus, the size of an object block for motion vector detection is M×M pels and the required accuracy in detection of a motion vector is an accuracy of a half pel, and motion vectors in an accuracy of two pels have been determined by detection at preceding stages up to the K-1th stage. Thus, description will be given below of operation of the motion vector detecting apparatus applied for detection of a motion vector at the last or Kth stage where the detection range is set to −1.0 to +1.0 in both of vertical and horizontal directions and the accuracy in detection is set to an accuracy of 0.5 pels.

Pels of an object block for motion vector detection are inputted from an input port 101 and stored into the buffer memory 3, and pels of a search area are inputted from another input port 102 and stored into the buffer memory 4. The half pel interpolator 2 receives the data from the buffer memory 4, interpolates half pels both in a vertical direction and a horizontal direction into the received data, and outputs search area data 103a to 103e after pel interpolation to the motion vector detection circuit 1. Then, a minimum value of the output of the motion vector detection circuit 1 is detected by the minimum value detector 5, and the value of a candidate vector corresponding to the minimum value is outputted as a motion vector 105 from the minimum value detector 5.

Figure 2:
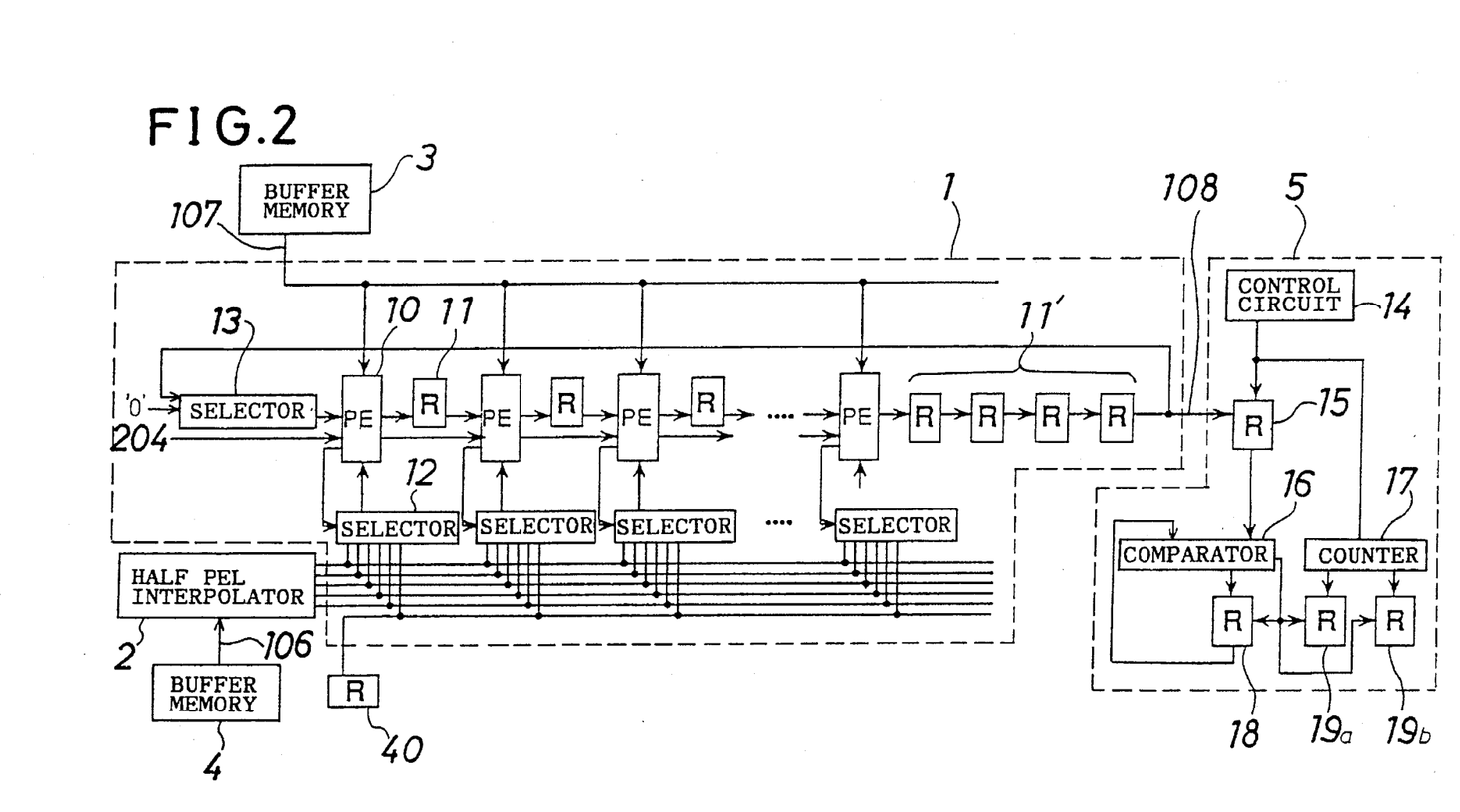
FIG. 2 is a block diagram showing details of a motion vector detection circuit and a minimum value detector of the motion vector detection apparatus shown in FIG. 1.

Details of the motion vector detection circuit 1 and the minimum value detector 5 in the present embodiment are shown in FIG. 2. Referring to FIG. 2, the motion vector detection circuit 1 includes a plurality of processor elements (PE) 10 each for accumulating an absolute value of a difference between two pel data, a plurality of one-data registers (R) 11 connected in cascade connection in an alternate relationship with the processor elements 10, a plurality of selectors 12 provided corresponding to the processor elements 10 each for selecting a pel of a search area, and a selector 13 for selecting input data to the first stage one of the processor elements 10 in the series connection. Meanwhile, the minimum value detector 5 includes a register (R) 15 for storing a sum of error absolute values outputted from the motion vector detection circuit 1, a control circuit 14 for designating a writing timing into the register 15, a comparator 16 for minimum value selection, a counter 17 for indicating a candidate motion vector, a register 18 for storing a minimum value, and a pair of registers 19a and 19b for storing components of a motion vector in an X direction and a Y direction.

Where the size of an object block for motion vector detection is M×M pels and the number of pels of a search area after pel interpolation is (2N−1)x(2N−1), or in other words, where the number of pels of one line or one column of the object block for motion vector detection is M and the number of pels of the search area before pel interpolation is N, M processor elements 10 and M−1 registers 11 are connected in cascade connection in an alternate relationship with each other, and 2x(N−M) pel delaying registers 11' are connected in cascade connection to the last end of the cascade connection of the processor elements 10 and the registers 11 as seen in FIG. 2.

Figure 8:
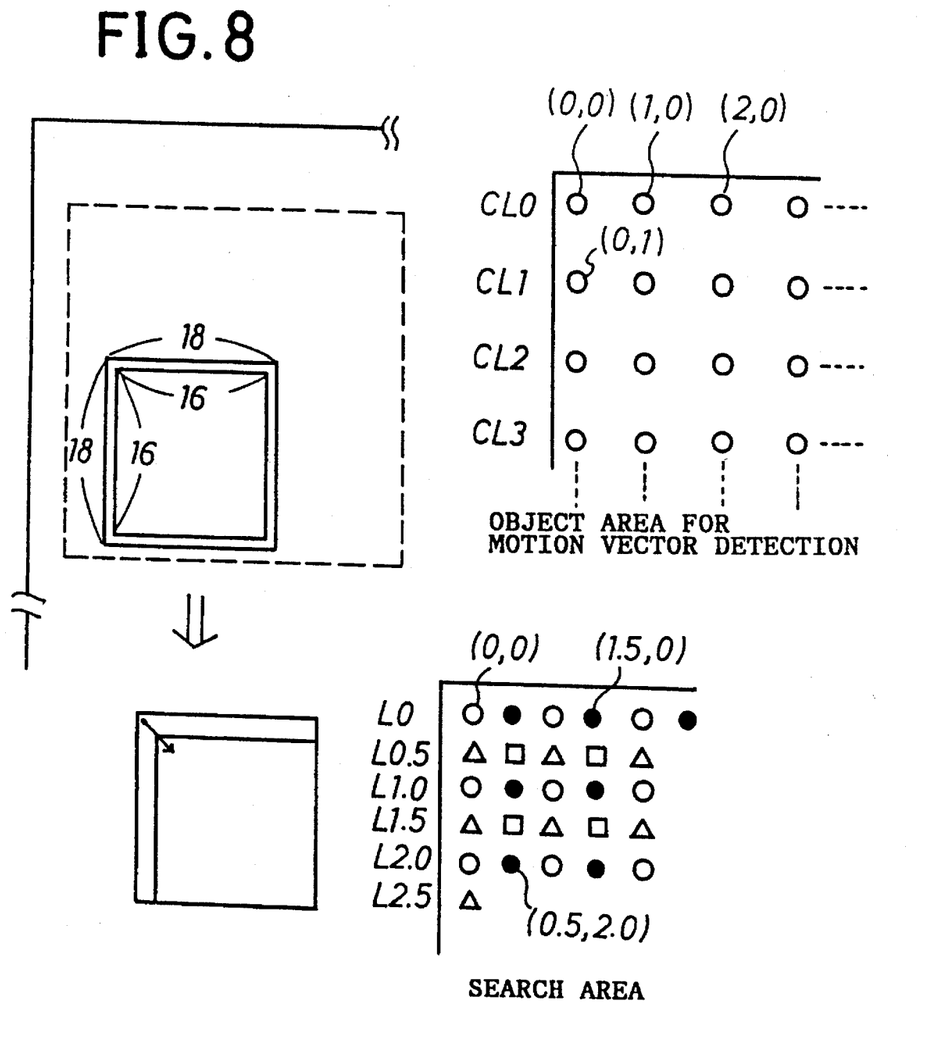
FIG. 8 is a diagrammatic view showing a motion vector detection range used in the motion vector detection apparatus shown in FIG. 1.

Such an example of motion vector detection as illustrated in FIG. 8 can be realized with M=16 and N=16.

Figure 3:
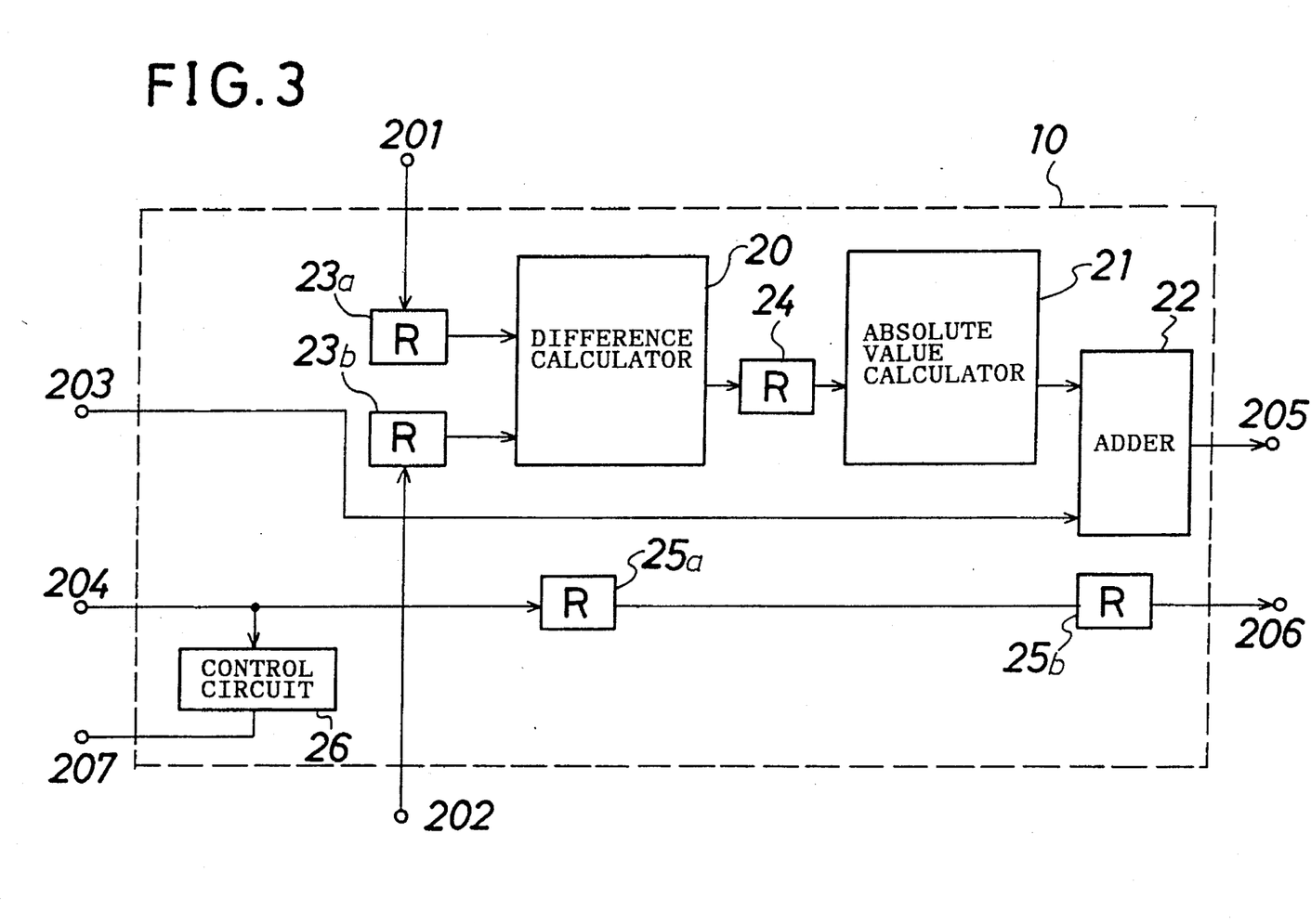
FIG. 3 is a block diagram showing details of a processor element employed in the motion vector detection circuit shown in FIG. 2.

Each of the processor elements 10 outputs, as shown in FIG. 3, from a control circuit 26 therein, a control signal 207 to select, from within outputs of the half pel interpolator 2 to 2x(N−M) buses, search area data required at the point of time by the processor element 10.

In the motion vector detection apparatus shown in FIG. 1, an object block for motion vector detection is first inputted to the buffer memory 3 and a search area is inputted to the buffer memory 4 in accordance with such a search area for motion vector detection as shown in FIG. 8. However, the data inputted to the buffer memory 4 are those data which has not been subject to pel interpolation as yet, and in the case of FIG. 8, pel data marked are inputted and stored.

Figure 4:
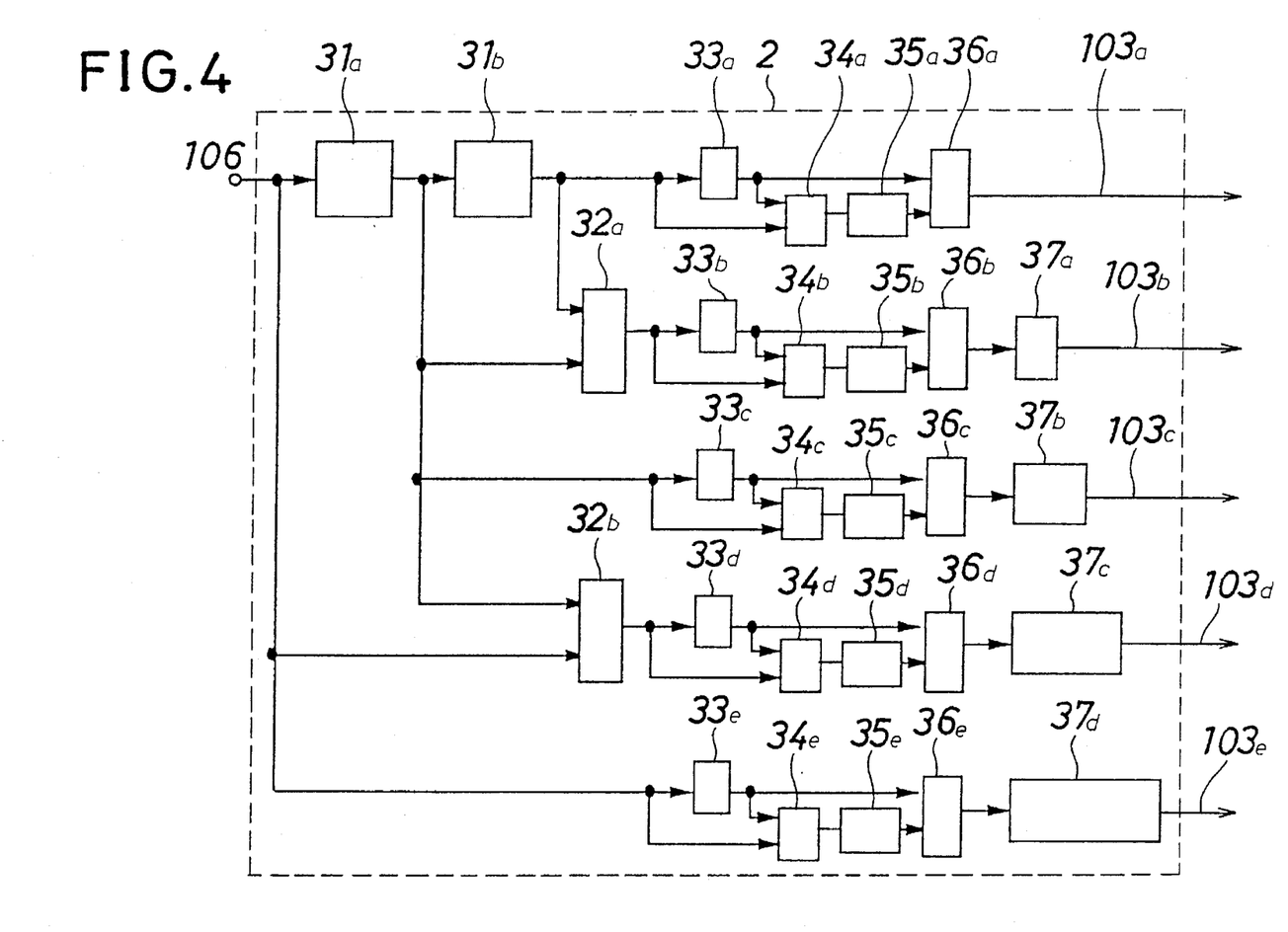
FIG. 4 is a block diagram showing details of a half pel interpolator of the motion vector detection apparatus shown in FIG. 1.

The half pel interpolator 2 has such a circuit configuration as, for example, shown in FIG. 4. Referring to FIG. 4, the half pel interpolator 2 includes a pair of line delaying registers 31a and 31b, a pair of operators 32a and 32b each for calculating an average value of pels adjacent to each other in the vertical direction, five pel delaying registers 33a to 33e, five operators 34a to 34e each for calculating an average value of pels adjacent to each other in the horizontal direction, five pel delaying registers 35a to 35e, and five selectors 36a to 36e each for outputting one of two inputs thereto. The selectors 36a to 36e are changed over alternately in response to each clock so that they alternately output data for which horizontal interpolation has been performed and data for which no horizontal interpolation has been performed. The half pelinterpolator 2 further includes four delaying shift registers 37a to 35d for allowing the motion vector detection circuit 1 to operate at suitable required timings.

Figure 5:
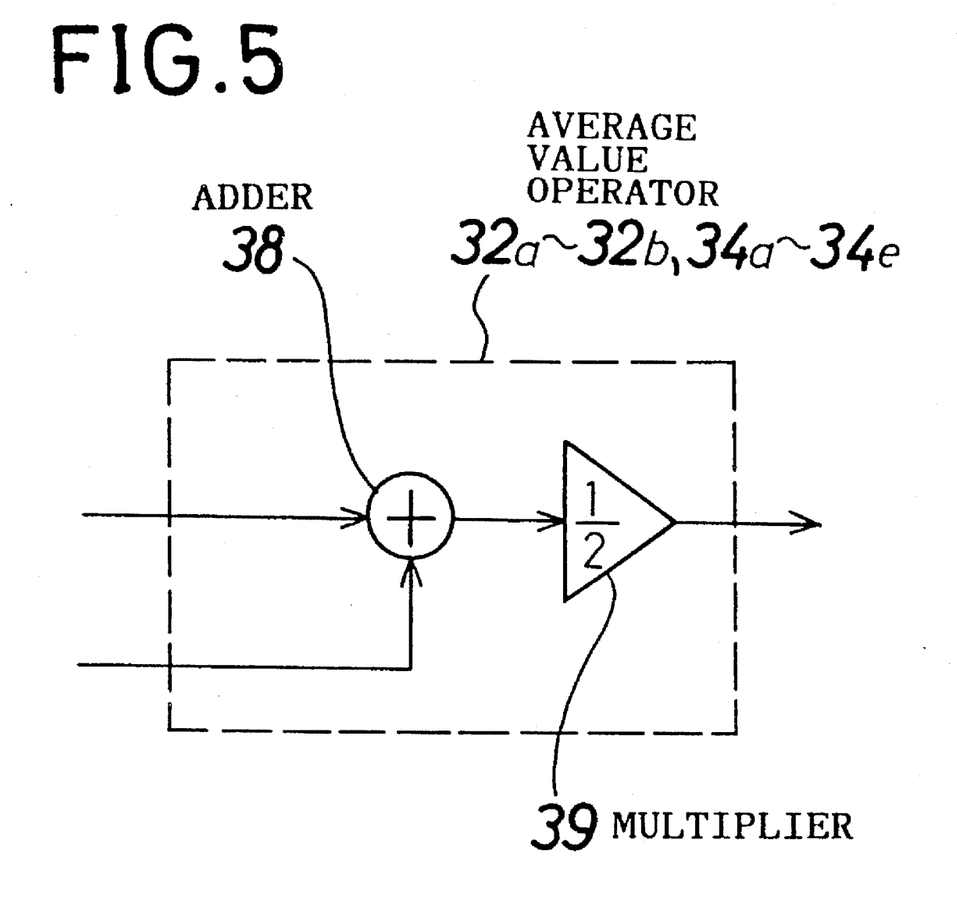
FIG. 5 is a block diagram showing details of an average value calculator of the half pel interpolator shown in FIG. 4.

Each of the average value operators 32a, 32b and 34a to 34e inputs data of two pels adjacent to each other in the vertical direction or the horizontal direction, obtained by delaying the data of one of the two pels by line delaying or pel delaying described above, at a same point of time and outputs, as an interpolation pel value, an average value of the two pels by means of an adder 38 and a multiplier 39 which is provided for multiplying an output value of the adder 38 by ½ as shown in FIG. 5.

Subsequently, timings of operation of the entire motion vector detection apparatus will be described with reference to FIGS. 6 and 7. It is to be noted that contents of data represented as L and CL in FIG. 6 are such line data as illustrated in FIG. 8, and numerical values shown above the data all correspond to the numbers of clocks after starting of inputting of data from the input 106 to the half pel interpolator 2.

Data 106 of 18×18 pels are read out for each two blocks in block scanning order from the buffer memory 4 in FIG. 2. From the data inputting timings of FIG. 6 and FIG. 7 which is a detailed view of FIG. 6, it can be seen that it is possible to obtain data outputs of the buses Bus0 to Bus4 illustrated in FIG. 6 (in which the buses Bus0 to Bus4 are shown briefly as B0 to B4, respectively) and FIG. 7 at the outputs 103a to 103e which correspond to the arrangement shown in FIG. 4.

Figure 6A:
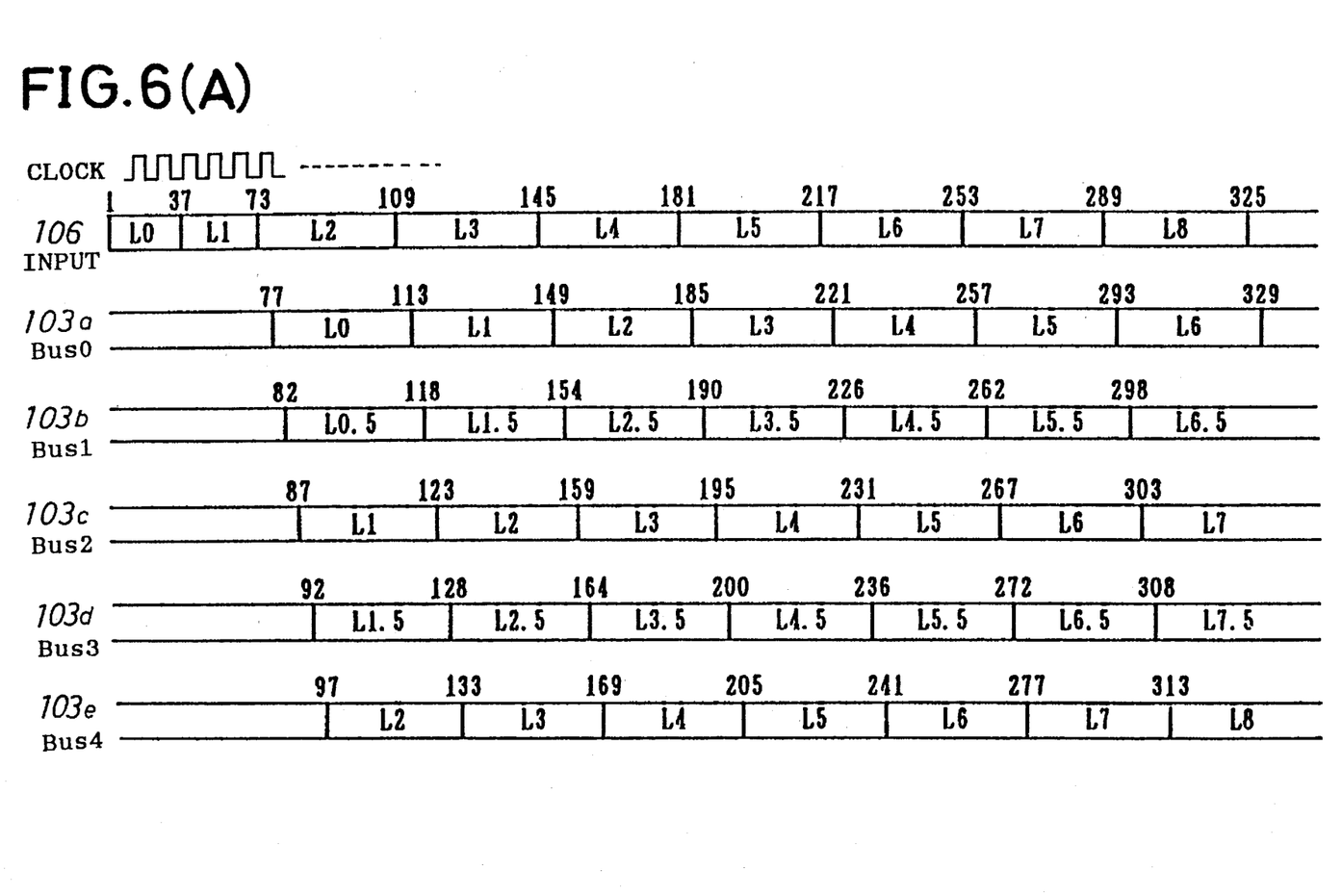
FIG. 6 is a time chart illustrating operation timings of the motion vector detection apparatus shown in FIG. 1.
Figure 6B:
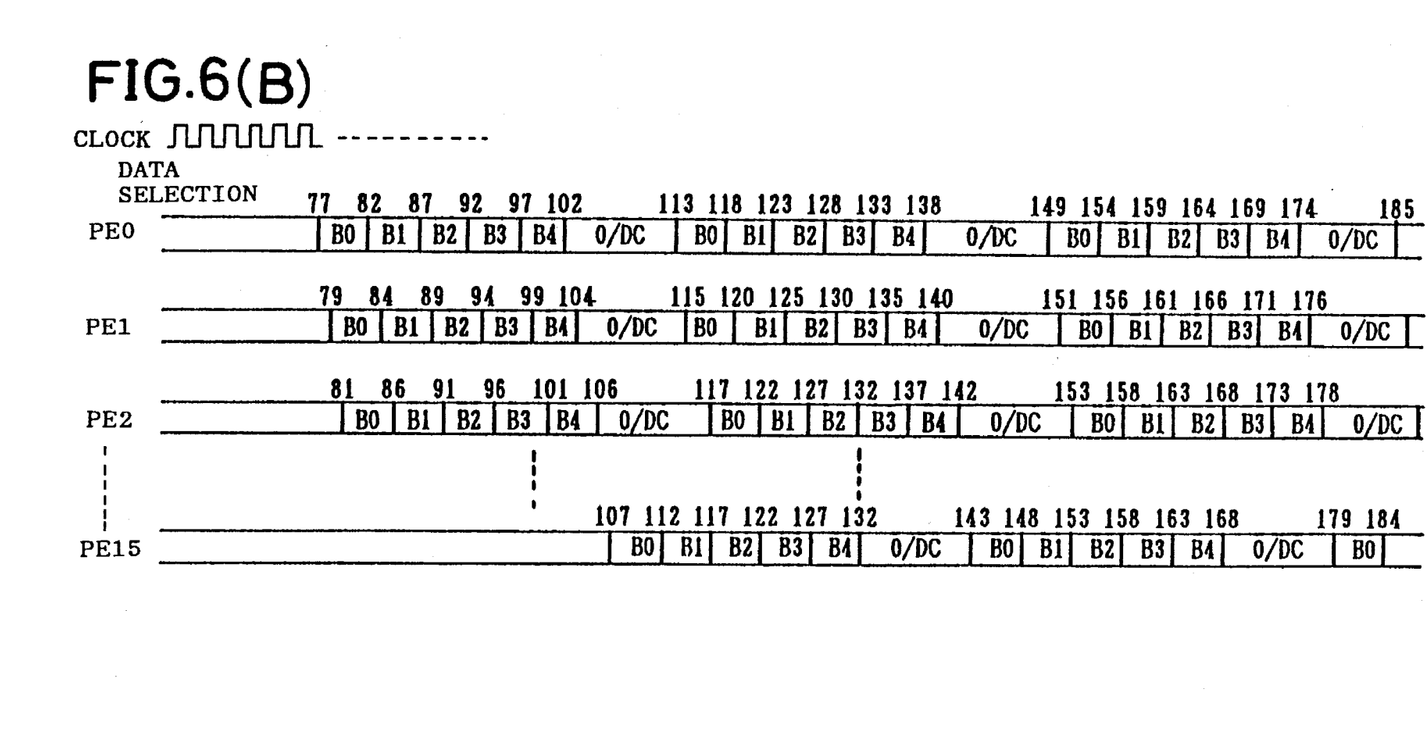
Figure 6C:
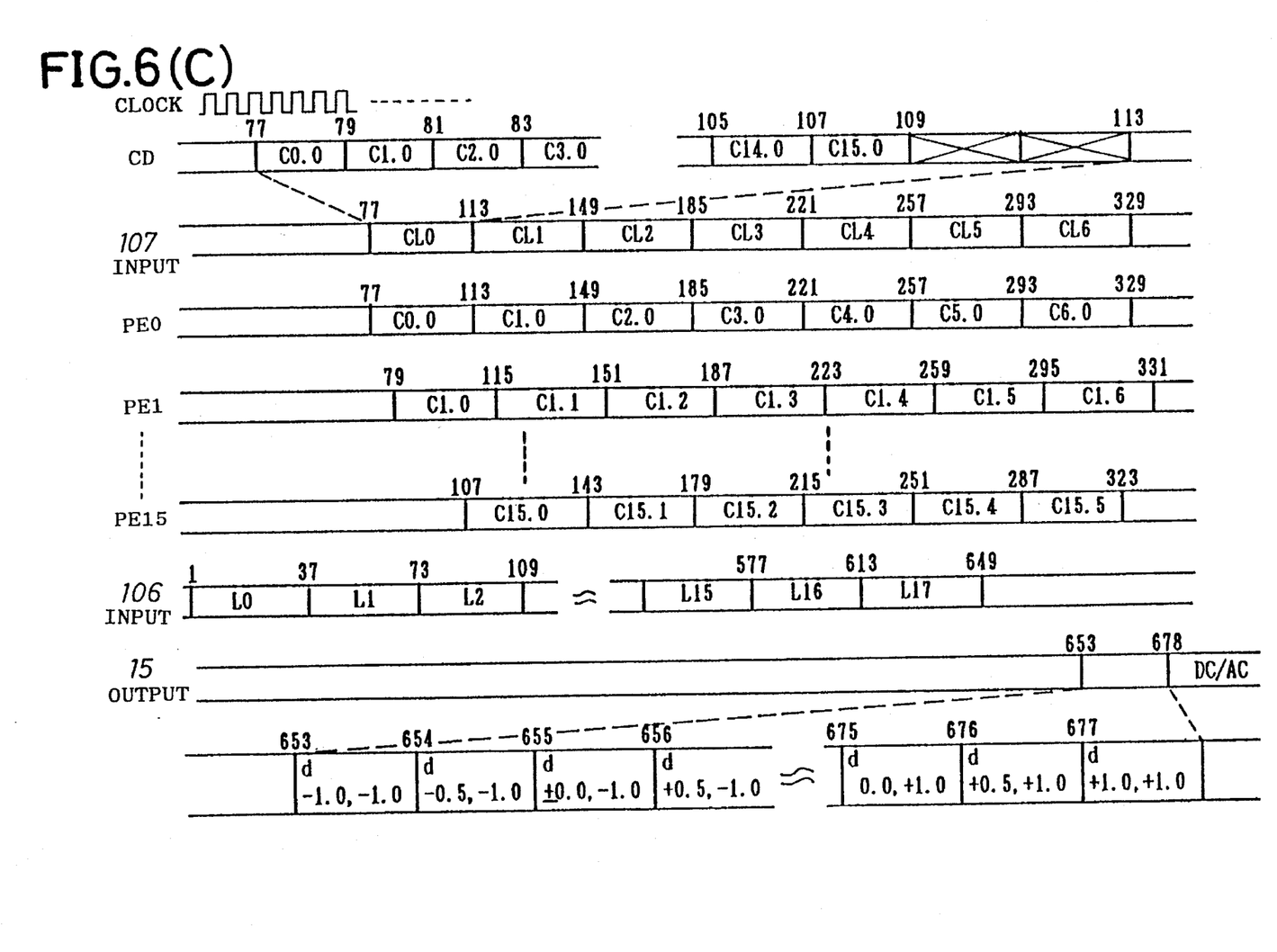
Figure 7:
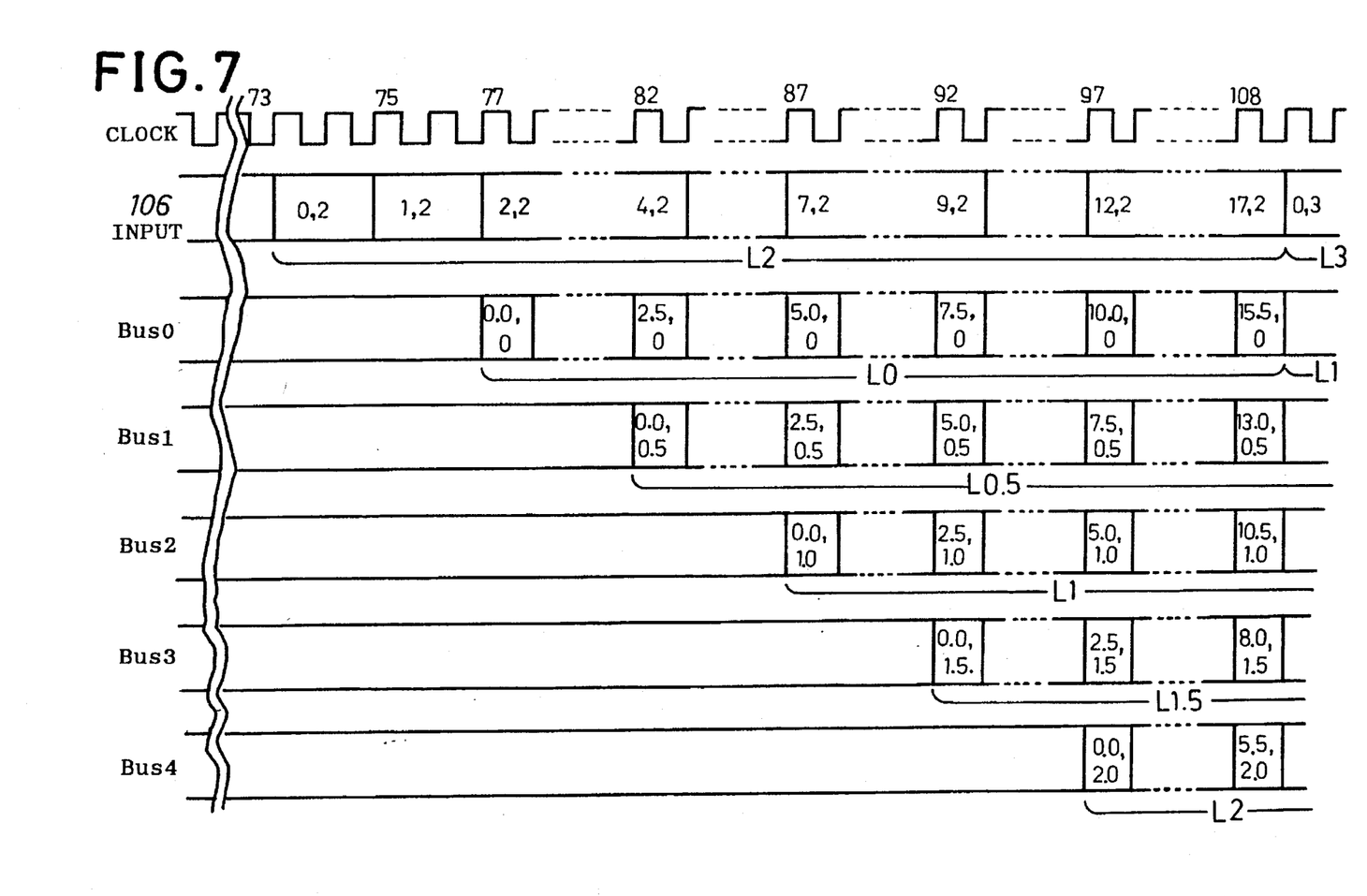
FIG. 7 is a time chart showing details of part of the time chart of FIG. 6.

Detailed timings of inputting and outputting of data for realizing operation for motion vector detection by an accuracy of a half pel and contents of selection of the data selector 12 of each processor element 10 are also illustrated in FIG. 6.

The motion vector detection circuit 1 performs calculation of a difference between frames corresponding to candidate motion vectors designated by a search range for all of the pels within an object block for motion vector detection, and outputs a total value of absolute values of differences of pels between blocks for the individual vectors.

In order to allow operation of the motion vector detection circuit 1, the buffer memory 4 sends out search area pel data at the timing of the input 106 to the half picture element interpolator 2, and the buffer memory 3 sends out data of an object block for motion vector detection at the timing or the input 107 to the data inputting section of the motion vector detection circuit 1 in accordance with the timings illustrated in FIG. 6. Each processor element 10 performs accumulation of an absolute value difference between pel data which have been inputted from the buffer memory 3 in accordance with the timing of FIG. 6 and for which a motion vector is being detected and search area pel data selected by and inputted from the selector 12, and outputs a resulted value to a register 11 or a register 11' at the next stage. Internal operation of each processor element 10 in the motion vector detection circuit 1 will be hereinafter described.

A value 108 having passed through the M processor elements 10 and outputted from the registers 11' arranged at the last end of the M processor elements 10 is equal to an error absolute value sum for one line. By feeding back the value 108 to the selector 13 to looping the same by M times, a sum total of error absolute values of candidate vectors between blocks for the totaling M×M pels in the block can be determined. The selector 13 selectively inputs the thus fed back value 108 or a fixed initial value "0" to the processor element 10 at the first stage.

The output 108 after each looping which occurs by M times is written, for evaluation of the matching degree in block matching, into the register 15 under the control of a signal from the control circuit 14, and a minimum value among the data thus written in the register 15 which has the highest matching degree, that is, a minimum one of the values inputted to the register 15, is selected by means of a comparator 16 and a register 18 and written into the register 18. The values of components of the motion vector then are written into the registers 19a and 19b. The control circuit 14 controls the writing operation of the minimum value into the register 15 and also controls the writing operation of the component values of the motion vector into the registers 19a and 19b by way of the counter 17. Consequently, a minimum value among sum totals of error absolute values is stored in the register 18, and components of a motion vector in the perpendicular directions corresponding to the data written in the register 18 are stored in the registers 19a and 19b.

In the motion vector detection where M=16 and N=18, after outputting of last data of search area pels to the half pel interpolator 2 is completed, outputting of a sum total of error absolute values for 25 vectors is completed in the time of 678−649=29 clocks.

Details of each processor element 10 in the motion vector detection circuit 1 employed in the present invention are shown in FIG. 8. Referring to FIG. 3, the processor element 10 shown includes an operator 20 for calculating a difference between corresponding pels of an object block for motion vector detection and a search area, an operator 21 for calculating an absolute value of such difference calculated by the operator 20, an adder 22 for calculating the accumulated value of the output of the operator 21 with the output of another processor element 10 at a preceding stage, a pair of registers 23a and 23b For storing pel data, and a register 24 for storing a difference value outputted from the difference operator 20. The control circuit 26 of the processor element 10 performs change-over control of the selector 12 provided for storing a suitable search area pel element into the register 23b. The processor element 10 further includes a pair of registers 25a and 25b for successively transmitting data bus selection contents inputted from a data bus selection content input 207 to a succeeding processor element by way of a data bus section content output 206.

Operation of the processor element 10 will be described with reference to FIG. 3. Pels of an object block for motion vector detection are inputted from the input port 201 and stored into the register 23a. Of the pel data of the search area from the input 202, those data which correspond to the candidate vectors are inputted to the register 23b. In this instance, in order to allow selective inputting of suitable data from the data buses 103a to 103e, the control circuit 26 generates a control signal for data selection from the output port 207 to the selector 12. The contents of the data selection are such that, where the processor element at the top of the cascade connection is represented by PE0 and the last processor element is represented by PE15, as shown at portions of PE0 to PE15 in FIG. 6, the timings of bus selection are set so that they are displaced by Just two clocks between adjacent processor elements, by which pipeline processing of block matching can be realized.

Accordingly, the bus selection contents executed by the control circuit 26 make bus data selection contents of the control circuit 26 at the processor element at the next stage after a delay of two clocks by way of the registers 25a and 25b. The difference calculator 20 calculates the difference between peldata of the registers 23a and 23b and stores results of the calculation into the register 24. At a next clock, the absolute value calculator 21 calculates an absolute value of the difference, and the adder 22 adds the absolute value to the output of the processor element at the preceding stage (the L-1th processor element for the Lth processor element) inputted from the input port 203 and outputs a result of the addition as an accumulated value to the output port 205.

Figure 9:
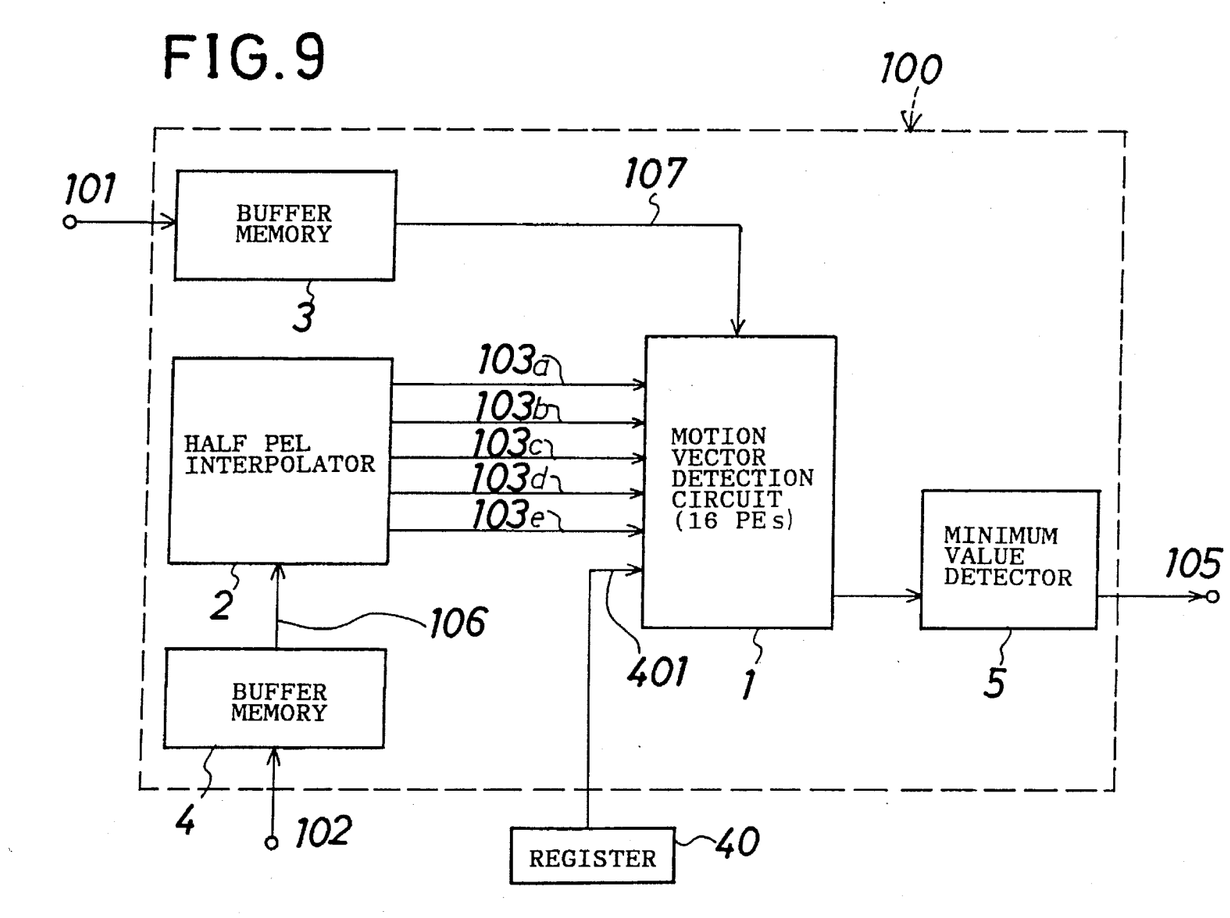
FIG. 9 is a block diagram of another motion vector detection apparatus showing a second preferred embodiment of the present invention.

On the other hand, it is apparent that, by using such a register 40 as shown in FIG. 9 and setting the value of the register 40 to 0 or an average value of an object block for motion vector detection while a value of a reference area pel designated by the selector 12 is set to the value of the input port 401 in the motion vector detection circuit 1, an average value of intra-block pel data of the object block for motion vector detection and AC components (L1 norms from the average value) of the intra-block pels can be calculated.

Having now fully described the invention, it will be apparent to one of ordinary skill in the art that many changes and modifications can be made thereto without departing from the spirit and scope of the invention as set forth herein.

What is claimed is:

1. A motion vector detection apparatus for a moving picture wherein each frame of a moving picture composed of a plurality of successive moving picture frames is divided into a plurality of blocks each including a plurality of picture elements and a correlation value between an image in a certain block in a present frame and an image in a reference frame different from the present frame is calculated to estimate a motion vector of the moving picture, comprising:

a first storage means for storing data of picture elements of a search area within the reference frame;

a second storage means for storing data of picture elements of an object block for motion vector detection in the present frame;

a half picture element interpolation circuit comprising a plurality of output sections for computing interpolated data by interpolating half picture elements in horizontal and vertical directions into the data of picture elements stored in said first storage means, supplying said interpolated data to said plurality of output sections, and outputting said interpolated data in parallel from said plurality of output sections;

a motion vector detection circuit including M, serially connected stages, each of said stages comprises a processor element, each of said processor elements including picture element selection means for selecting data of picture elements from said output sections of said half picture element interpolation circuit, absolute value calculation means for calculating absolute values of differences between the picture element data selected by said picture element selection means and picture element data read out from said second storage means, and addition means for adding the absolute values from said absolute value calculation means, said addition means of said processor elements successively accumulating the absolute values of the differences to produce a sum total of the absolute values, said sum total being outputted from the processor element at the last stage of said motion vector detection circuit; and a minimum value detector for detecting a minimum value of the output of said motion vector detection circuit and outputting the value of a candidate vector which corresponds to the thus detected minimum value as a motion vector.

2. A motion vector detection apparatus for a moving picture as claimed in claim 1, wherein said motion vector detection circuit further includes:

a single initial value selector for selecting an initial value for the accumulated value to be applied to said addition means of the processor element at the first stage of said M processor elements;

first M−1 registers connected between adjacent ones of said M stages each for delaying a picture element; and a plurality of second registers each for delaying a picture element, said plurality of second registers being connected in series between the processor element of said last stage and said minimum value detector, the output of the second register at said last stage of said plurality of second registers being inputted to said initial value selector to form a feed back loop construction.

\* \* \* \* \*

UNITED STATES PATENT AND TRADEMARK OFFICE
CERTIFICATE OF CORRECTION

PATENT NO. : 5,512,962
DATED : April 30, 1996
INVENTOR(S) : Hideki HOMMA

It is certified that error appears in the above-indentified patent and that said Letters Patent is hereby corrected as shown below:

Column 2, line 15, delete "①".

Column 2, line 16, after "either" insert --①--.

Column 5, line 45, after "marked" insert --○--.

Column 7, line 16, delete "FIG. 8" and insert --FIG. 3--.

Signed and Sealed this

Sixth Day of August, 1996

*Attest:*

BRUCE LEHMAN

*Attesting Officer*     *Commissioner of Patents and Trademarks*